(12) United States Patent
Kim (10) Patent No.: US 9,631,751 B2
(45) Date of Patent: *Apr. 25, 2017

(54) FLEXIBLE TUBE FOR EXHAUST PIPE OF AUTOMOBILE

(71) Applicant: SJM Co., Ltd., Gyeonggi-do (KR)

(72) Inventor: Kyeong Jung Kim, Gyeonggi-do (KR)

(73) Assignee: SJM CO., LTD., Gyeonggi-Do (KR)

( * ) Notice: Subject to any disclaimer, the term of this patent is extended or adjusted under 35 U.S.C. 154(b) by 272 days.

This patent is subject to a terminal disclaimer.

(21) Appl. No.: 14/478,705

(22) Filed: Sep. 5, 2014

(65) Prior Publication Data

US 2015/0204470 A1 Jul. 23, 2015

(30) Foreign Application Priority Data

Jan. 22, 2014 (KR) .......................... 10-2014-0007962

(51) Int. Cl.
| | |
|---|---|
| *F16L 21/00* | (2006.01) |
| *F16L 27/10* | (2006.01) |
| *F01N 1/16* | (2006.01) |
| *F01N 13/18* | (2010.01) |
| *F16L 27/111* | (2006.01) |

(52) U.S. Cl.
CPC ............ *F16L 27/1004* (2013.01); *F01N 1/16* (2013.01); *F01N 13/1816* (2013.01); *F16L 27/111* (2013.01)

(58) Field of Classification Search
USPC ......................................... 285/226, 227, 49
See application file for complete search history.

(56) References Cited

U.S. PATENT DOCUMENTS

| | | | | |
|---|---|---|---|---|
| 5,660,419 | A * | 8/1997 | Kim .................... | F01N 13/1816 138/109 |
| 6,557,901 | B1 * | 5/2003 | Garat ..................... | F16L 21/00 285/226 |
| 6,848,478 | B2 * | 2/2005 | Nagai ................. | F01N 13/1816 138/112 |
| 9,181,846 | B2 * | 11/2015 | Kim ....................... | F01N 13/08 |
| 2007/0035125 | A1 * | 2/2007 | Kim .................... | F01N 13/1816 285/226 |
| 2008/0036200 | A1 * | 2/2008 | Fredo ........................ | F16F 9/30 285/49 |
| 2013/0015652 | A1 * | 1/2013 | Thomas .............. | F01N 13/1816 285/47 |
| 2016/0003388 | A1 * | 1/2016 | Barbely .............. | F16L 27/1004 285/226 |
| 2016/0201832 | A1 * | 7/2016 | Barbely .................. | F16L 27/11 285/226 |

* cited by examiner

*Primary Examiner* — Aaron Dunwoody
(74) *Attorney, Agent, or Firm* — Kirton McConkie; Evan R. Witt

(57) ABSTRACT

A flexible tube for an exhaust pipe of an automobile is disclosed, of which the bellows member has protrusion portions, a center portion and both end portions such that the protrusion portions have a uniform outer diameter, and the center portion has a maximum depression inner diameter which is larger than a minimum depression inner diameter of the both end portions, and the outer cover member is formed of an outer net with a network structure, wherein a depression inner diameter in the center of a bellows is larger than a depression inner diameter at the both ends such that a gap from an interlocking member increases so as to prevent the interference between the bellows and the interlocking member.

6 Claims, 8 Drawing Sheets

Prior Art

FLEXIBLE TUBE FOR EXHAUST PIPE OF AUTOMOBILE

BACKGROUND OF THE INVENTION

Field of the Invention

The present invention relates to a flexible tube for an exhaust pipe of an automobile, wherein a depression inner diameter in the center of a bellows is formed to be larger than a depression inner diameter at the both ends thereof such that a gap from an interlocking member increases so as to prevent the interference between the bellows and the interlocking member, thereby improving the driving noise due to the vibration and noise, and the depression portions of the both end portions are formed to be small so as to flexibly absorb the external force and displacement applied to the bellows, thereby improving the flexibility and durability of the bellows.

Description of the Related Art

In general, an exhaust pipe is connected to the engine of an automobile so as to discharge exhaust gas, wherein a flexible coupling is provided to the connection portion thereof such that the flexible coupling absorbs external force which is generated from the vibration of the engine and the vibration of the surface of a road so as to extend the lifespan of the exhaust pipe and improve the ride comfort.

The flexible coupling which is connected to the exhaust pipe of an automobile as above generally absorbs the tension, compression and bending displacement which are generated in response to the movement of an exhaust system from the engine vibration and the road surface vibration, wherein torsion displacement generated in every direction may follow according to the mounting conditions of the engine, the direction in which the displacement generates, and the design and shape of the entire exhaust pipe.

Therefore, a bellows made from a metal material is mainly used in order to improve the performances for maintaining airtightness and absorbing vibration and displacement, which are the core functions of the flexible coupling for an exhaust pipe of an automobile.

In addition, the flexible coupling is provided with an interlocking member as disclosed in EP 041089 A1, wherein the interlocking member simultaneously absorbs the deformation such as the inward compression, bending or the like of a bellows member which is made from a metal material in the shape of a cylinder with repetitive corrugations, controls the displacement within the range of elasticity limit of the bellows member, makes the flow of exhaust gas smooth as a guide tube, and protects the bellows member from the exhaust gas of high temperature.

Further, the bellow member is formed in a structure, in which the outside portion of the bellows member is surrounded by a braid member and, in this situation, the both ends of the bellows member and the braid member are compressed together with caps in the circumferential direction so as to be finished by spot-welding.

That is, one end is coupled to an engine side and the other side is coupled to an exhaust pipe side such that the exhaust gas passes through a center portion and the bellows member and the interlocking member absorb shocks, deformation or the like, which act between the engine and the exhaust pipe, through contraction and expansion.

The currently widely used bellows member have a disadvantage that the bellows member cannot sufficiently serve as a means for restraining the tension, compression and bending displacement caused by the vibration of an engine or the vibration of an exhaust system which is applied from the road surface while driving, since the outer diameter and the inner diameter of the bellows member are formed to be uniform so that the height of all protrusions is uniform or the height of just a first depression portion is lowered.

Therefore, in the flexible coupling, Korean Utility Model Registration Number 184089 discloses a flexible coupling for an automobile exhaust pipe as a means for extending the lifespan of a bellows and transmitting and dispersing the vibration of an engine and the vibration and stress generated during driving.

Figure 6:
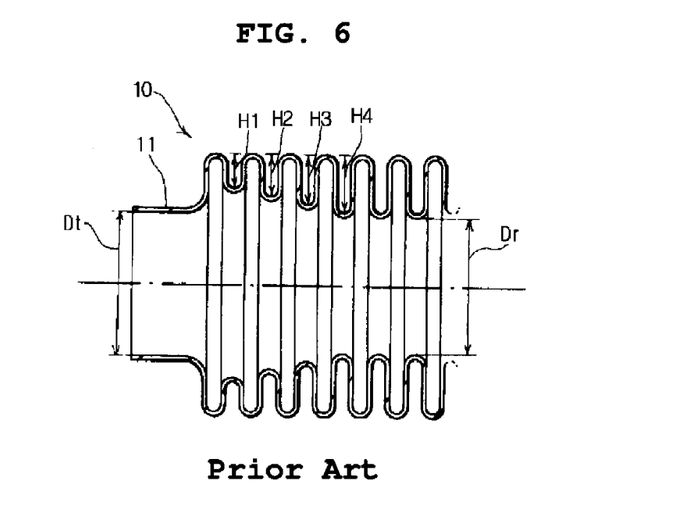
FIG. 6 is a half-sectional view showing the structure of a prior art bellows member.
Figure 7:
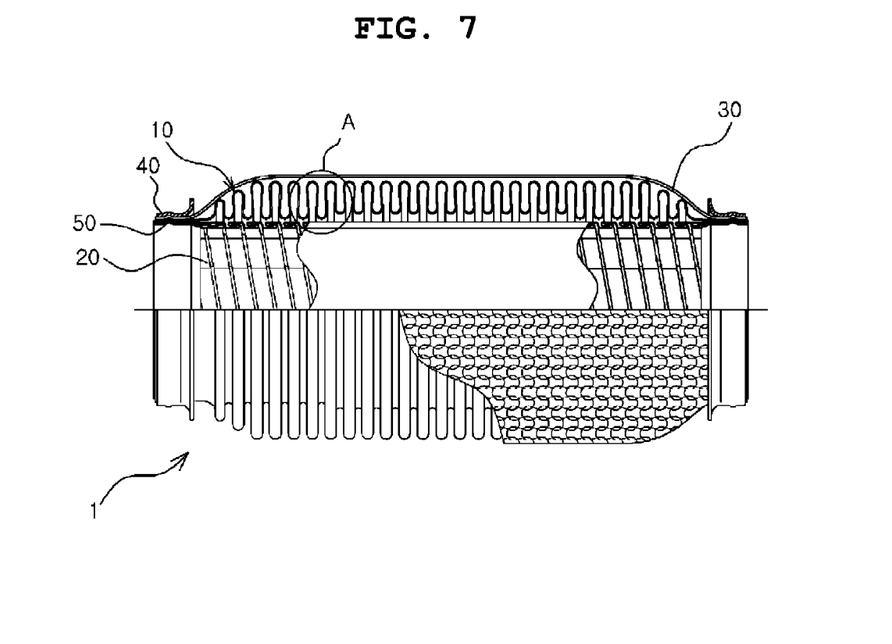
FIG. 7 to FIG. 10 are half-sectional views showing flexible tubes for an exhaust pipe of an automobile according to other embodiments of the present invention.

According to this flexible coupling for an automobile exhaust pipe, as shown in FIG. 6, the heights H1-H4 of protrusions gradually increase from a first protrusion at an end portion 11 side of a bellows member 10 to the other side and the inner diameter of the depression portion is formed to gradually decrease from a first depression portion to the other side at a uniform angle such that the flexible coupling absorbs displacement with respect to the axial direction or the bending direction of the braid member 10 and then is restored when the external force is removed.

Further, the depression portion minimum inner diameter Dr of the bellows member 10 is formed to be equal to or larger than the inner diameter Dt of the end portions 11.

However, the bellows member as described above has disadvantages that manufacturing costs increase and manufacturing work thereof is complicated since the bellows member is made from a metal material with repetitively formed protrusions and depressions, wherein the height of the protrusions gradually increases towards a center portion in the inward direction such that the inner diameter of the depressions gradually decreases.

Furthermore, the minimum inner diameter of the center portion of the bellows member is smaller than the diameter of the both end portions thereof such that the flow of exhaust gas stays in the center portion at the time of the discharge of the exhaust gas, thereby degrading engine performances.

In particular, a sufficient gap is secured between the interlocking member and the bellows member so as to prevent damage to the bellows member due to the mutual interference in the vibration or the generation of noise resulted from the mutual interference. However, the forming of such a sufficient gap causes the decrease of the height of the protrusions of the bellows member such that the durability of the bellows member becomes decreased or the noise may be generated.

That is, the vibration applied to the flexible tube in the exhaust system of an automobile is even serious in the center portion rather than the both end portions. Therefore, a sufficient gap is secured between the interlocking member and the bellows member. However, the bellows member as described above has the center portion of which inner diameter is the same as that of the conventional bellows member. Therefore, the center portion at which the serious vibration is applied cannot prevent the interference between the interlocking member and the bellows member with respect to the vibration or the like.

PRIOR ART DOCUMENT

Patent Document

Patent Document 1: Korean Utility Model Registration Number 184089—"flexible coupling for an automobile exhaust pipe", registered on 20 Mar. 2000

SUMMARY OF THE INVENTION

Problems to be Solved by the Invention

The present invention has been made to solve the above-mentioned problems of the related art, and an objective of the invention is to provide a flexible tube for an exhaust pipe of an automobile, wherein the depression inner diameter of a center portion in a bellows member, at which the vibration is seriously generated, is formed to be larger than the depression inner diameter of both end portions at which vibration is relatively small, such that a sufficient gap is maintained between the bellows member and an interlocking member so as to improve the durability of the bellows member. Another objective of the present invention is to provide a flexible tube for an exhaust pipe of an automobile, wherein a reinforcement section is further provided to the center portion of a bellows member in the axial direction so as to further absorb the external force and displacement applied to the bellows, thereby improving the flexibility and durability of the bellows member.

Still another objective of the present invention is to provide a flexible tube for an exhaust pipe of an automobile, wherein the depression portions of the center portion of the bellows member are higher than the depression portions of the both end portions so as to reduce material costs of the bellows members and improve productivity, while reducing the vibration of the center portion so as to improve the vibration properties, thereby improving marketability and reliability of the bellows member.

Means for Solving the Problems

In order to achieve the above mentioned objectives, a flexible tube for an exhaust pipe of an automobile, comprises:

a bellows member 10 made from a metal material in the shape of a hollow cylinder having corrugations which are repetitively formed in a wave form;

an interlocking member 20 positioned in the bellows member 10 with a predetermined gap from the bellows member 10 and having a spiral groove spirally formed on the interlocking member 20 so as to absorb deformation;

an outer member 30 surrounding the outside of the bellows member 10;

cap members 40 for coupling the outer cover member 30 such that the outer cover member 30 is fixed to the outside portions of the both ends of the bellows member 10; and intermediate members 50 formed in the shape of a ring, of which one end is fixed to the bellows member 10 and the other end is fixed to the interlocking member 20 by overlapping the interlocking member 20 inwards, wherein the bellows member 10 has protrusion portions 12, a center portion C and both end portions U such that the protrusion portions 12 have a uniform outer diameter, and the center portion C has a maximum depression inner diameter D3 which is larger than a minimum depression inner diameter D1 of the both end portions U, and wherein the outer cover member 30 is formed of an outer net with a network structure.

Further, the bellows member 10 has a depression inner diameter D2 which is formed such that depression portions 13 gradually increase from the minimum depression inner diameter D1 of the both end portions U to the center portion C in the outward direction, and a maximum depression inner diameter D3 which is uniformly formed in the center.

Furthermore, the center portion C of the bellows member 10 further includes a reinforcement section S which is formed with low protrusion portions 12a and high depression portions 13a, of which each height is smaller than the protrusion portions 12 and the depression portions 13 which are uniformly repeated.

Further, the minimum depression inner diameter D1 of the both end portions U of the bellows member 10 gradually increases at a uniform angle towards the maximum depression inner diameter D3 of the center portion C such that the inner diameter of the center portion C is formed to be large, and the reinforcement sections S is formed in the shape of a ring with the low protrusion portions 12a and the high depression portions 13a, of which each height is smaller than the protrusion portions 12 and the depression portions 13 which are uniformly repeated in the center portion C.

A gap which is formed between the interlocking member 20 and the bellows member 10 is further provided with a wire mesh 60 so as to prevent the contact of the interlocking member 20 and the bellows member 10.

Effect of the Invention

According to the present invention as structured above, the maximum depression inner diameter of a center portion in a bellows member, at which the vibration is seriously generated, is formed to be larger than the minimum depression inner diameter of both end portions, at which the vibration is rather small than the center portion, such that a sufficient gap is maintained between the bellows member and an interlocking member and no interference is generated between the bellows member and the interlocking member in spite of vibration or the like so as to improve the lifespan of the bellows member.

Further, in order to prevent interference between the bellows member and the interlocking member, the depression portion diameter of the center portion is formed to be large while the depression portion diameter of the both end portions, at which the vibration is relatively small, is formed to be small, such that the height of the protrusions of the both end portions may be increased, so as to improve flexibility while dispersing the external force and displacement applied to the bellows member, thereby improving the durability of the bellows member.

Furthermore, the depression inner diameter of the center portion of the bellows member is higher than the depression inner diameter of the both end portions such that the flow of exhaust gas may be smooth, the material costs of the bellows member may be reduced, and the productivity may be improved, thereby improving the marketability and reliability of the bellows member.

In addition, a gap which is formed between the interlocking member and the bellows member is provided with a wire mesh so as to absorb the impact due to the vibration which is generated during driving and prevent the generation of noise.

DETAILED DESCRIPTION OF THE PREFERRED EMBODIMENTS

Hereinafter, the present invention will be described in greater detail by reference to the drawings. However, the present invention should not be construed as being limited thereto.

In a flexible tube for an exhaust pipe of an automobile according to the present invention, as shown in the accompanied drawings, the depression inner diameter of the center portion of a bellows member is formed to be larger than the depression inner diameter of both end portions so as to increase a gap from an interlocking member, such that the interference between the bellows member and the interlocking member may be prevented. The depression portions of the both end portions are formed to be small so as to flexibly absorb the external force and displacement applied to the bellows member such that the flexibility and durability of the bellows member may be improved.

Figure 1:
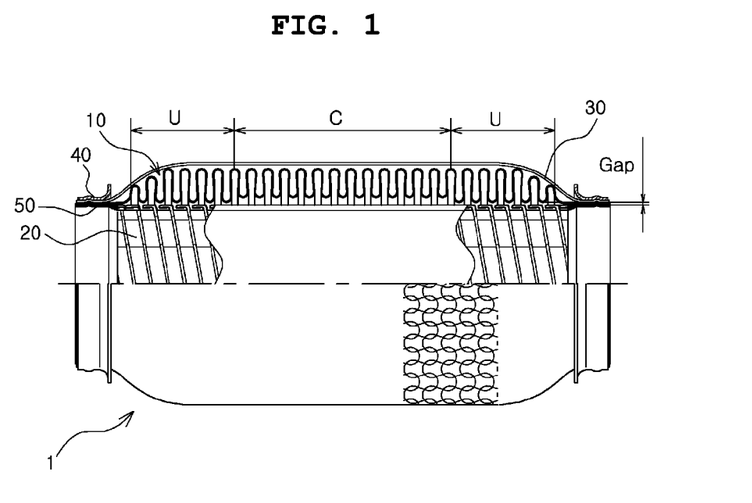
FIG. 1 is a half-sectional view showing the basic structure of a flexible tube for an exhaust pipe of an automobile according to one embodiment of the present invention.

First of all, a flexible tube 1 for an exhaust pipe according to the present invention includes a bellows member 10 formed in the shape of a hollow cylinder and having corrugations which are repetitively formed in a wave form, an interlocking member 20 positioned in the bellows member 10 with a predetermined gap from the bellows member 10, an outer cover member 30 for surrounding the outside portion of the bellows member 10, cap members 40 for fixing the outer cover member 30 to the outside portions of the both ends of the bellows member 10, and intermediate members 50 having one end fixed to the bellows member 10 and the other end fixed to the interlocking member 20 by overlapping the interlocking member 20 inwards, wherein it is important to sufficiently maintain the gap from the interlocking member 20 by forming the maximum depression inner diameter D3 of the center portion C to be larger than the minimum depression inner diameter D1 of the both end portions U.

At this time, it is important that the bellows member 10 is formed such that the maximum depression inner diameter D3 of the center portion C is expanded to be larger than the minimum depression inner diameter D1 of the both end portions U so as to sufficiently maintain the gap from the interlocking member 20.

Figure 2:
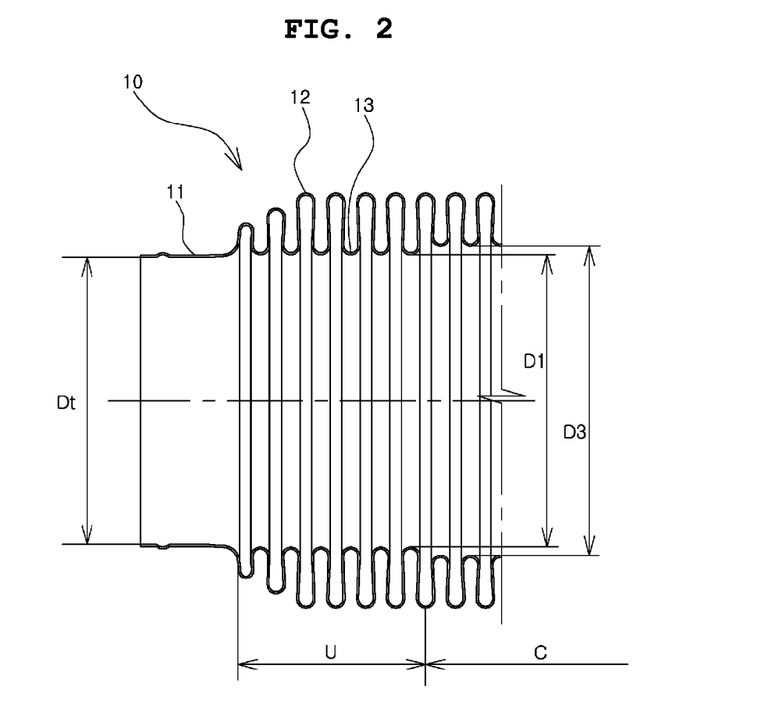
FIG. 2 is an expanded sectional view showing the structure of a bellows member according to the present invention.

To this end, referring to FIG. 2 which shows the approximate directions used in the description, the bellows member 10 is made from a metal material in the shape of a pipe, wherein the bellows member 10 is provided with repetitive corrugations in a wave form by protrusion portions 12 and depression portions 13 which are continuously formed in the lengthwise direction. Therefore, as the displacement is generated in the axial direction or in the bending direction due to the vibration or shocks, the protrusion portions 12 and the depression portions 13 which are continuously formed in the lengthwise direction serve to absorb the displacement by being elastically bent, to prevent the leakage of exhaust gas, to absorb extension and bending. The protrusion portions 12 and the depression portions 13 are restored after the displacement is absorbed and the external force is removed.

Further, the interlocking member 20 is positioned in the bellows member 10 while maintaining a predetermined gap from the bellows member 10.

The interlocking member 20 has a spiral groove which is spirally formed throughout the interlocking member 20 such that the damping effect is generated by the friction in the spiral groove at the time of the axial or bending displacement is generated, wherein the spiral groove mainly absorbs the deformation in the lengthwise direction and uniformly maintains the space of a path through which the exhaust gas passes, thereby serving to restrain the generation of turbulence.

The outer cover member 30 surrounds the outside of the bellows member 10, wherein an outer net which is braided with a thin metal wire in a net structure is selected as for the outer cover member 30.

Therefore, the bellows member 10 may be flexibly deformed with a large displacement even with respect to the displacement and tension in the compression direction. The outer cover member 30 and the both end portions of the outside of the bellows member 10 are coupled to the cap members 40 such that the cap members 40 are fixed to the bellows member 10.

Meanwhile, the bellows member 10 and the interlocking member 20 are connected to each other by the intermediate member 50 which is formed in the shape of a ring.

That is, in the state that the front ends of the intermediate members 50 are in accordance with the end portions of the bellows member 10 and the horizontal portions of the bellows member 10, the outer cover member 30 and the cap members 40 are mutually overlapped, the front ends of the intermediate members 50 is attached to the bellows member 10 by clamping means which have fastening function in the circumferential direction or by carrying out spot-welding on the several points thereof.

Further, the other ends of the intermediate members 50 are partially overlapped by the interlocking member 20 in the state that the other ends of the intermediate members 50 are folded towards the inside of the interlocking member 20, and then the spot-welding is carried out on several points such that the bellows member 10 and the interlocking member 20 are maintained in a completely coupled state.

At this time, the bellows member 10 according to the present invention has, as shown in FIG. 2, a uniform outer diameter of the protrusion portions 12, and the maximum depression inner diameter D3 of the center portion C is formed to be larger than the minimum depression inner diameter D1 of the both end portions U.

That is, the bellows member 10 has the maximum depression inner diameter D3 of the center portion C which is formed to be larger than the minimum depression inner diameter D1 of the both end portions U, and the protrusion portions 12 which are continuously formed in the lengthwise direction with the same height, in the state that the minimum depression inner diameter D1 of the both end portions U is formed to be equal to or larger than the inner diameter Dt of the end portions 11.

Therefore, the bellows member 10 may maintain the same gap as the conventional one between the interlocking member 20 which is positioned in the bellows member 10 and the both end portions U and a larger gap than the conventional one between the interlocking member 20 and the center portion C.

If the displacement in the axial direction or the bending direction is generated to the bellows member 10 and the interlocking member 20 due to the vibration or shock, displacement is generated more seriously in the center portion C of the bellows member 10 rather than in the both end portions U. However, the center portion C according to the present invention maintains the sufficient gap such that the damage to the bellows member 10 by the interlocking member 20 may be prevented.

To the contrary, a minimum gap is maintained from the interlocking member 20 to the both end portions U of the bellows member 10 at which the vibration is not serious. Therefore, the height of the protrusions of the both end portions U may be high, improving the flexibility and durability of the bellows member.

Figure 3:
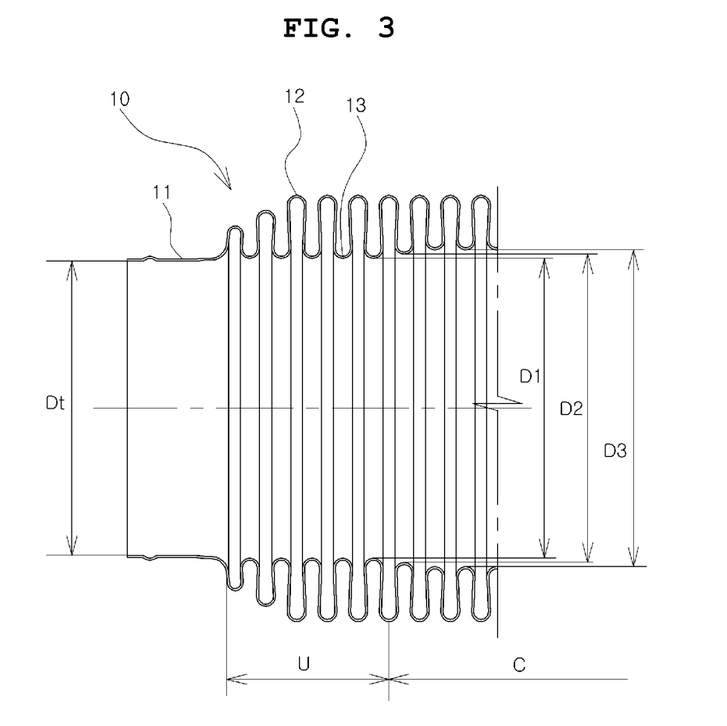
FIG. 3 to FIG. 5 are expanded sectional views showing flexible tubes for an exhaust pipe of an automobile according to other embodiments of the present invention.

Further, the bellows member 10 according to another embodiment, as shown in FIG. 3, has a depression inner diameter D2 which gradually increases from the minimum depression inner diameter D1 of the both end portions U to the center portion C, and a uniformly maximum inner diameter D3 in the center.

As described above, by forming a predetermined inclination from the both end portions U of the bellows member 10 to the center portion C, the bellows member 10 may be guided with an inclination with respect to the bending displacement such that the concentration of the stress generated by a sharp change of shape may be prevented and smooth movement may be secured.

In general, 5-25° is basically employed as the inclination of the inclined depression portions 13, and the number of the inclined depression portions is preferably set to be 1-3.

Figure 4:
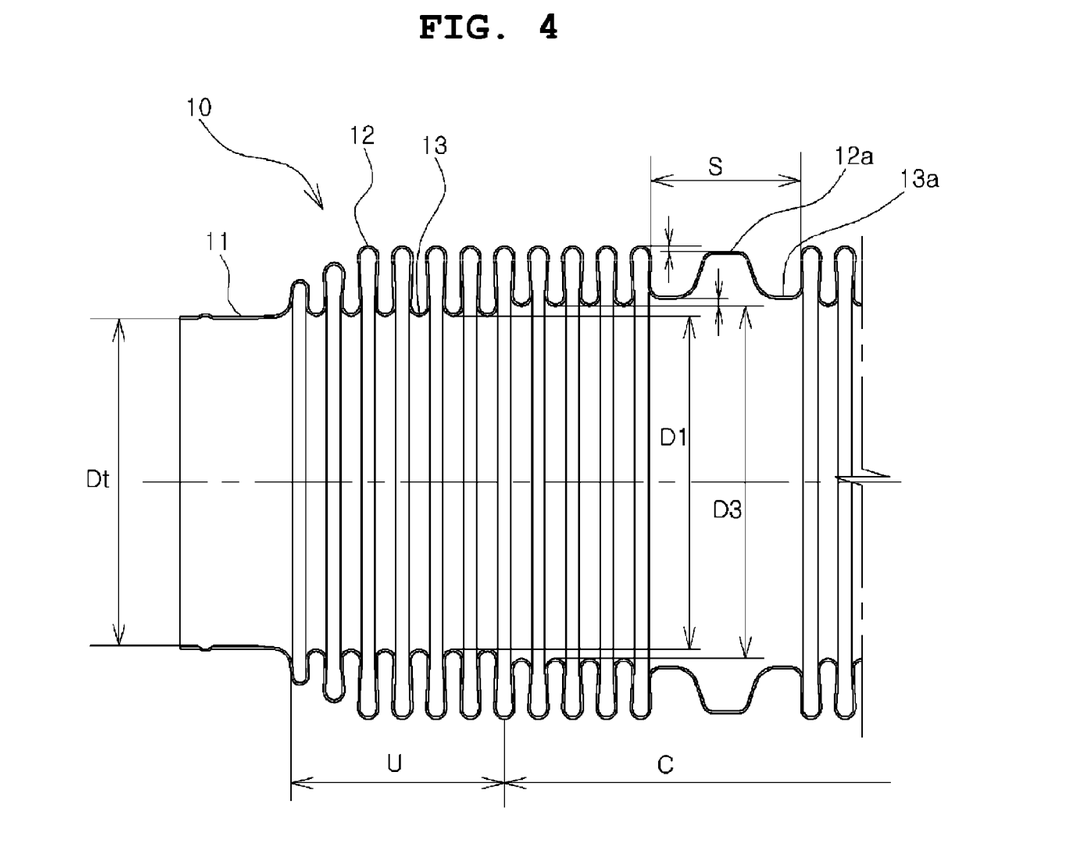

Further, as shown in FIG. 4, the center portion C of the bellows member 10 according to another embodiment of the present invention further includes reinforcement sections S which are formed with low protrusion portions 12a and high depression portions 13a, of which each height is lower than the protrusion portions 12 and the depression portions 13 which are uniformly repeated.

Figure 5:
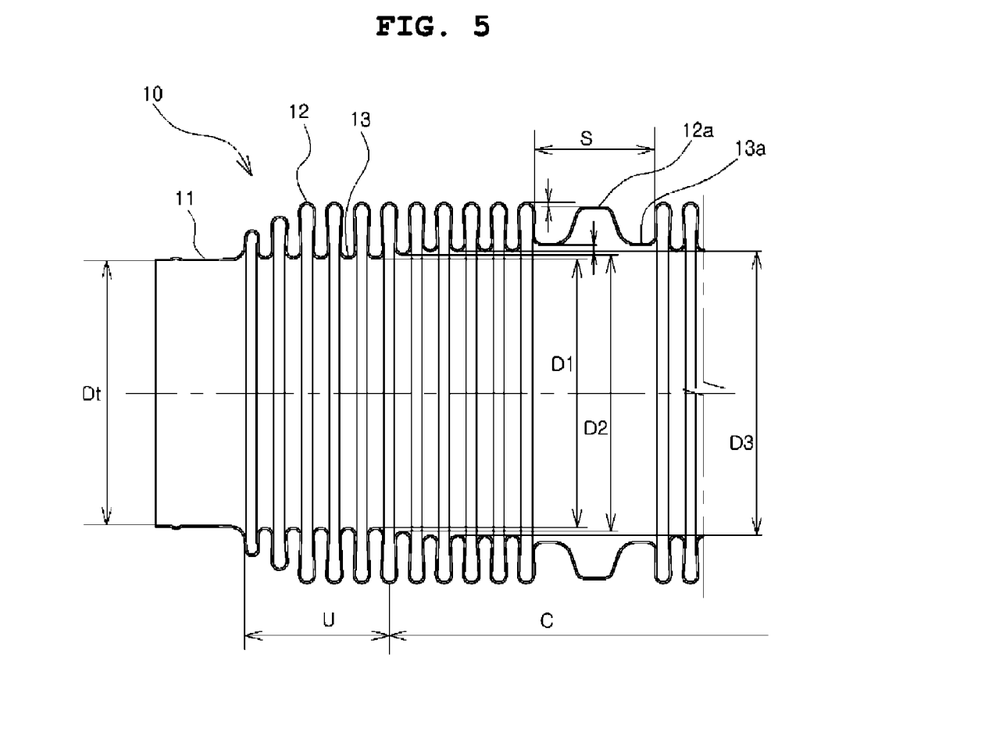

Furthermore, as shown in FIG. 5, the inner diameter of the depression portions 13 of the both end portions U of the bellows portion 10 gradually increases at a uniform angle towards the inner diameter of the depression portions 13 of the center portion C such that the inner diameter of the center portion C is formed to be large, and the center portion C further includes the reinforcement sections S which are formed in the shape of a ring and have the low protrusion portions 12a and the high depression portions 13a, of which each height is lower than the protrusion portions 12 and the depression portions 13 which are uniformly repeated on the center portion C.

The reinforcement sections S have advantages, wherein 2~5 protrusions of the center portion C of the bellows member 10 may be reduced, thereby reducing the consumption of materials so as to reduce manufacturing costs.

Figure 8:
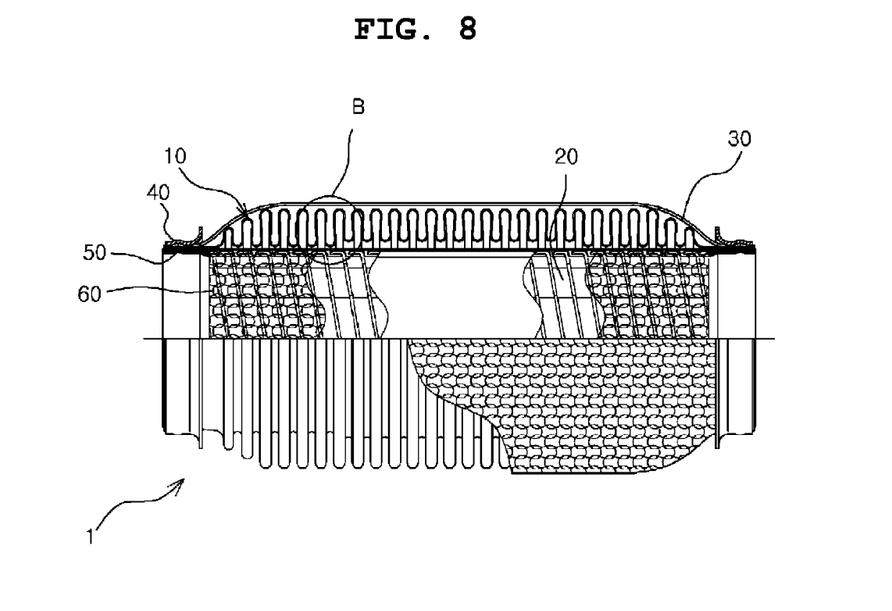
Figure 10:
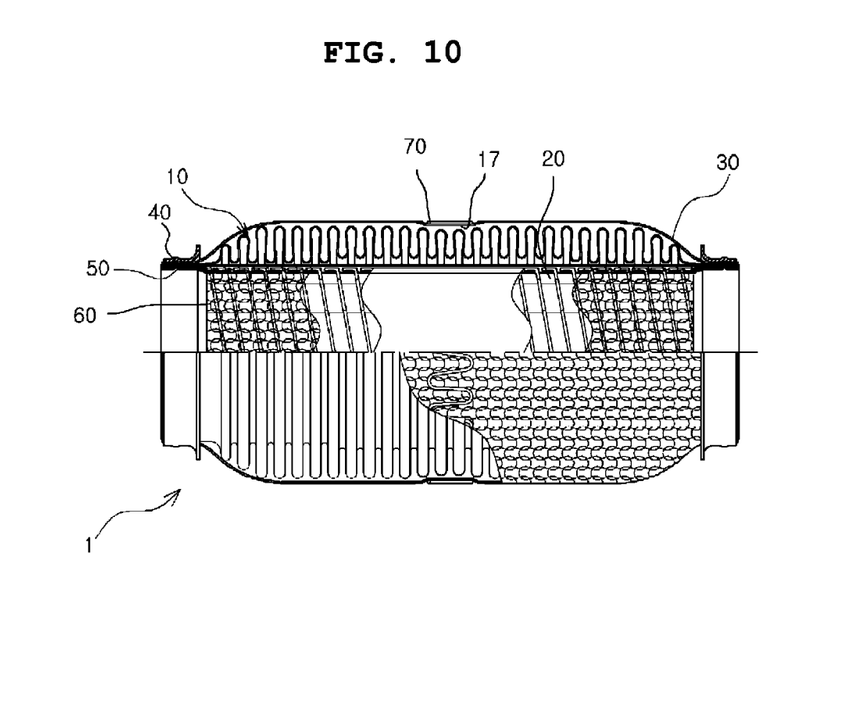
Figure 11:
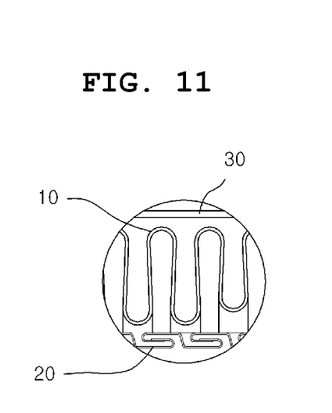
FIG. 11 is an expanded sectional view of portion 'A' of FIG. 7.
Figure 12:
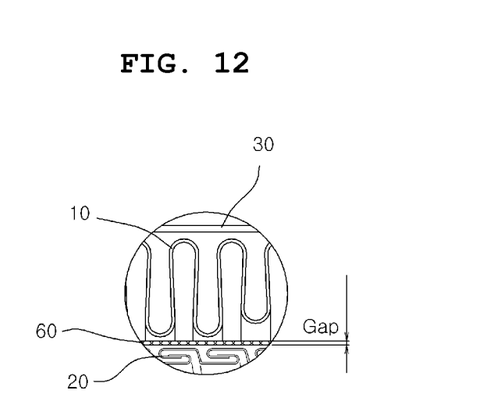
FIG. 12 is an expanded sectional view of portion 'B' of FIG. 8.

Meanwhile, as shown in FIG. 8 and FIG. 10, it is possible to further provide a wire mesh 60 to the gap which is formed between the interlocking member 20 and the bellows member 10 so as to prevent the contact of the interlocking member 20 and the bellows member 10.

The wire mesh 60 is an elastic material which is formed in the shape of a tube by compressing a net structure which is braided with a thin metal wire and the wire mesh 60 is fitted in the gap so as to elastically absorb the shock resulting from the vibration of the engine or the road surface during driving as well as the bending displacement or the like.

In addition, the wire mesh 60 can prevent the mutual contact of the bellows member and the interlocking member by the vibration during driving, thereby removing the sources of noise generation.

Figure 9:
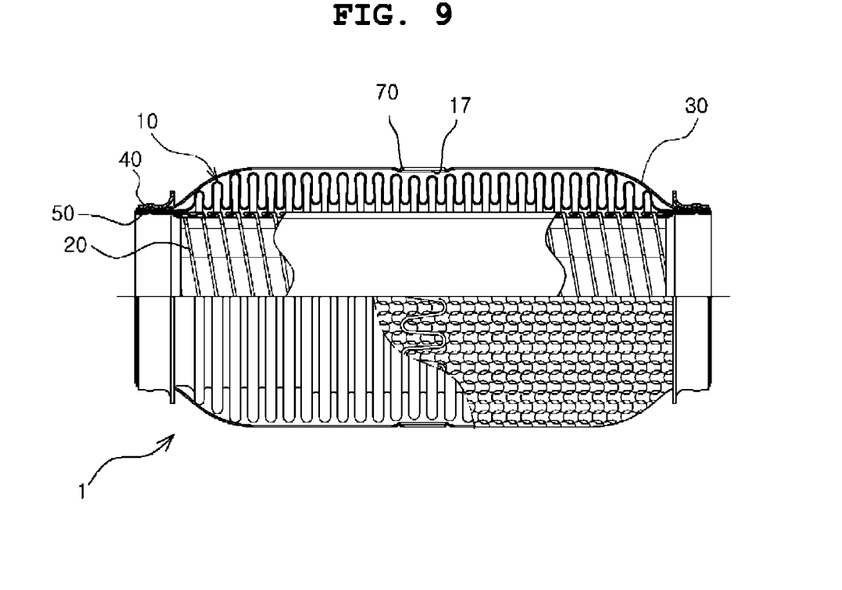

Furthermore, an elastic member 70 can be preferably mounted on the outside of the outer cover member 30 as shown in FIG. 9 and FIG. 10.

The elastic member 70 is a spring member which is basically formed in the shape of a ring for surrounding the bellows member 10 and the outer cover member 30, wherein the elastic member 70 is formed in the shape of undulating so as to be bent and to obtain tension.

The elastic member 70 generates fastening force towards the bellows member 10.

At this time, the radial diameter of the corrugations decreases in the approximately middle portion of the bellows member 10 so as to form a securing groove 17, and the elastic member 70 is received in the securing groove 17 and prevented from escaping.

Meanwhile, it is preferable to mount another braid member 80 on the outside of the outer cover member 30 which is made from an outer net.

The braid member 80 is braided with a thin metal wire and further surrounds the outside of the outer cover member 30 for the flexible deformation by the large displacement with respect to the displacement and tension in the compression direction.

Figure 13:
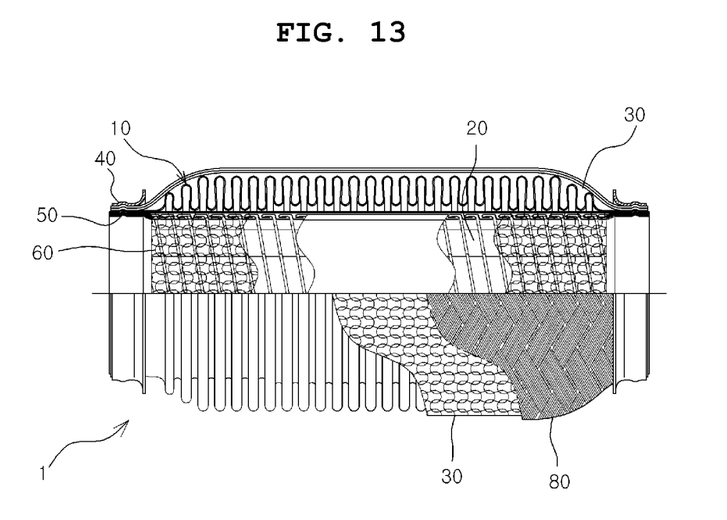
FIG. 13 is a half-sectional view showing a flexible tube for an exhaust pipe of an automobile according to another embodiment of the present invention.

The braid member 80 is coupled to the cap members 40 at the both end portions of the outside thereof as the outer cover member 30 and the mainly fixed with the bellows member 10 by clamping FIG. 13.

Having described our invention as related to the present embodiments, it is our intention that the invention not be limited by any of the embodiments and drawings of the description, and it is apparent to those skilled in the art that various changes and modifications of the present invention may be made without departing the spirit and scope of the invention.

Brief Explanation of Reference Signs

101 - flexible tube for an exhaust pipe
10 - bellows member
12 - protrusion portions
12a - low protrusion portions
13 - depression portions
13a - high depression portions
20 - interlocking member
30 - outer cover member
40 - cap member
50 - intermediate member
60 - wire mesh
70 - elastic member
80 - braid member
C: center portion
U: both end portions
S: reinforcement section
D1 - minimum depression inner diameter
D3 - maximum depression inner diameter

What is claimed is:

1. A flexible tube for an exhaust pipe of an automobile, comprising:
a bellows member made from a metal material in the shape of a hollow cylinder having corrugations which are repetitively formed in a wave form, wherein the bellows member has protrusion portions, a center portion, and two end portions;
an interlocking member positioned in the bellows member with a predetermined gap from the bellows member and having a spiral groove spirally formed on the interlocking member so as to absorb deformation;
an outer member surrounding the outside of the bellows member;

cap members for coupling the outer cover member such that the outer cover member is fixed to an outside of both end portions of the bellows member; and intermediate members formed in the shape of a ring, of which one end is fixed to the bellows member and the other end is fixed to the interlocking member by overlapping the interlocking member inwards, wherein the protrusion portions have a uniform outer diameter, and the center portion has a maximum depression inner diameter which is larger than a minimum depression inner diameter of both end portions, and wherein the outer cover member is formed of an outer net with a network structure.

2. The flexible tube for an exhaust pipe of an automobile according to claim 1, wherein the bellows member has a depression inner diameter which is formed such that depression portions gradually increase from the minimum depression inner diameter of both end portions to the center portion in the outward direction, and a maximum depression inner diameter which is uniformly formed in the center.

3. The flexible tube for an exhaust pipe of an automobile according to claim 1, wherein the center portion of the bellows member further includes reinforcement sections formed with low protrusion portions and high depression portions, of which each height is smaller than the protrusion portions and the depression portions which are uniformly repeated.

4. The flexible tube for an exhaust pipe of an automobile according to claim 2, wherein the minimum depression inner diameter of both end portions of the bellows member gradually increases at a uniform angle towards the maximum depression inner diameter of the center portion such that the inner diameter of the center portion is formed to be large, and the reinforcement sections is formed in the shape of a ring with the low protrusion portions and the high depression portions, of which each height is smaller than the protrusion portions and the depression portions which are uniformly repeated in the center portion.

5. The flexible tube for an exhaust pipe of an automobile according to claim 1, wherein a gap formed between the interlocking member and the bellows member is further provided with a wire mesh so as to prevent the contact of the interlocking member and the bellows member.

6. The flexible tube for an exhaust pipe of an automobile according to claim 1, wherein the outer cover member formed of the outer net is further surrounded by a braid member on the outside thereof.

* * * * *